Nov. 14, 1950 — L. E. TROTH — 2,530,097

PICKUP DELIVERY TRUCK

Filed Oct. 4, 1949

INVENTOR.
Lawrence E. Troth,
BY
atty.

Patented Nov. 14, 1950

2,530,097

UNITED STATES PATENT OFFICE 2,530,097

PICKUP DELIVERY TRUCK

Lawrence E. Troth, Chevy Chase, Md.

Application October 4, 1949, Serial No. 119,417

3 Claims. (Cl. 296—24)

This invention relates to certain new and useful improvements in trucks.

The invention is more particularly concerned with the construction of the truck body and for trucks that are generally referred to in the trade as pickup trucks, the vehicle comprising a cab and an open top rear body.

Pickup trucks of the foregoing character are frequently used by hardware stores and similar establishments for the delivery of tools or equipment, such as long-handled lawn mowers, rakes, hoes, and similar garden tools as well as fragile or perishable merchandise, such as lamps, seed, fertilizers and like articles or materials. With an open top truck body, garden tools and the like can be safely carried therein, but it has heretofore been the practice when hauling fragile or perishable articles in an open body pickup truck, to place such articles or materials on the seat for the driver in the cab and such articles or material frequently become dislodged or fall from the seat and are damaged.

It is therefore the primary object of this invention to provide an open top pickup delivery truck having an extension at the rear of the cab to provide a shelf space rearwardly of the back of the seat in the cab and within the cab, with the shelf portion of such cab extension disposed in substantially the same plane as the upper edges of the side walls of the open top truck body and with the shelf designed for carrying fragile or perishable materials while the open top truck body still retains its entire overall length for the carrying of long handled implements, such as lawn mowers, rakes, hoes, bagged material, etc., or any material or apparatus that can usually be transported in an open body pickup truck.

With the above and other objects in view that will become apparent as the nature of the invention is better understood, the same consists in the novel form, combination and arrangement of parts hereinafter more fully described, shown in the accompanying drawing, and claimed.

Figure 1:
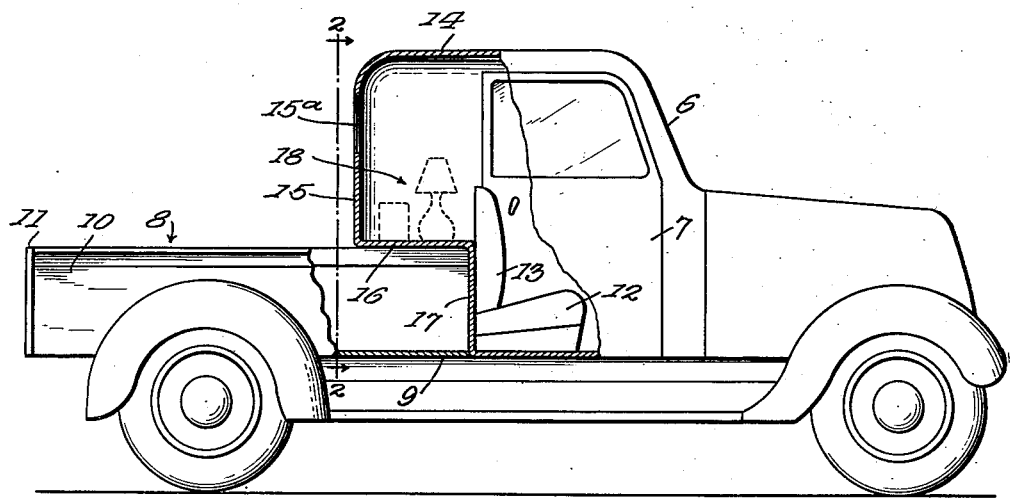
Figure 2:
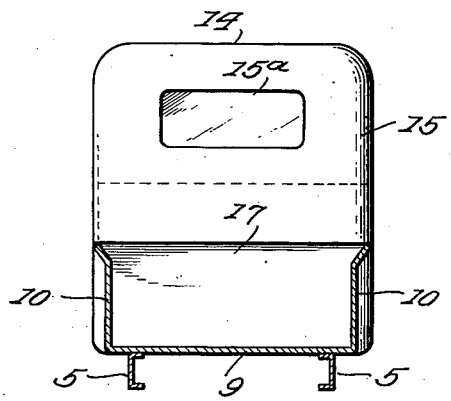

In the accompanying drawing:

Figure 1 is a side elevational view, partly broken away and shown in section, of a pickup truck constructed in accordance with the present invention and illustrating a rear extension on the upper part of the cab of the truck overlying the open top truck body, and Figure 2 is a cross-sectional view taken on line 2—2 of Figure 1.

Referring more in detail to the accompanying drawing, there is illustrated a pickup truck of the type hereinafter referred to and the general construction thereof is the known type wherein there is provided a chassis briefly illustrated in Figure 2 by the reference character 5 and upon which chassis the usual body is mounted that includes a closed cab 6 having side doors 7 and a rearwardly positioned open top truck body designated in general by the reference character 8 that includes a bottom wall 9, side walls 10, and where desired, a tail gate 11.

As illustrated in Figure 1, the cab has the usual driver's seat including the seat element 12 and a vertical back 13, and in the usual construction of pickup trucks of the foregoing character, the back wall of the cab 6 is in vertical alinement with the rear face of the vertical seat back 13.

As shown more clearly in Figure 1, the cab 6 is provided with a rear extension 14 that places the rear wall 15 of the cab an appreciable distance rearwardly of the seat back 13, and this rear extension on the cab has the usual rear window 15a, with the lower edge of its vertical wall 15 terminating substantially in the plane of the upper horizontal edges of the side walls 10 of the open top truck body. A horizontal shelf section 16 extends forwardly of the lower edge of the rear wall 15 of the cab extension substantially in the plane of the upper edges of the side walls 10 of the truck body and to the front cross wall 17 adjacent the seat back 13 that normally constitutes the forward wall of the open top truck body. It will be observed that the upper edge of the vertical seat back 13 extends above the horizontal shelf section 16 to provide a compartment 18 in the closed cab between the rear wall 15 of the cab extension and the seat back 13.

With a cab construction of the foregoing character on an open top pickup truck, it is possible to carry fragile or perishable articles within the cab and to be protected from the elements as well as from damage, certain articles of such a character being illustrated in Figure 1 by dotted lines as mounted on the shelf 16 within the cab and within easy reach of the driver. It will also be observed that the open top pickup truck retains its full overall length as the shelf 16 is disposed above the open top of the truck so that the usual elongated equipment carried by such pickup trucks can still be properly hauled without projecting rearwardly of the truck body.

While there is herein shown and described the preferred embodiment of the invention, it is nevertheless to be understood that minor changes may be made therein without departing from the spirit and scope of the invention as claimed.

I claim:

1. A pickup truck having a forward cab housing a seat with an upstanding back, a rear open top truck body, a rear extension on the upper portion of the cab having a bottom shelf overlying the forward end of the open top of the truck body and said shelf being below the upper end of the seat back with the seat back cooperating with the rear wall of the cab extension to form a compartment for the transportation of fragile and/or perishable articles within the cab extension.

2. In a pickup delivery truck of the type having a closed cab, a seat in said cab with an upstanding back, and an open top body rearwardly of said cab and having upstanding side walls, the upper rear portion of the cab having a compartment rearwardly of the seat and a shelf forming the bottom wall of the compartment overlying the forward end of the open top truck body and spaced above the bottom of the body, and the forward end of the shelf being located below the upper end of the seat back whereby said open top truck body is available for relatively large and long articles and said shelf constitutes a support within the cab for fragile and/or perishable articles.

3. A pickup delivery truck as in claim 2 wherein the shelf is substantially in the plane of the upper edges of the side walls of the open top truck body.

LAWRENCE E. TROTH.

REFERENCES CITED

The following references are of record in the file of this patent:

UNITED STATES PATENTS

| Number | Name | Date |
|---|---|---|
| 1,548,969 | Winn | Aug. 11, 1925 |
| 2,267,509 | Strong | Dec. 23, 1941 |
| 2,324,677 | Cadwallader | July 20, 1943 |
| 2,442,889 | Deal | June 8, 1948 |